Dec. 11, 1934.  A. F. MASURY ET AL  1,984,072
RUBBER ARTICULATED ENDLESS TRACK
Filed Sept. 24, 1932   2 Sheets-Sheet 1

INVENTORS
*Alfred F. Masury and Frank J. Kohlberger,*
BY
*Redding, Greeley, O'Shea & Campbell*
THEIR ATTORNEYS

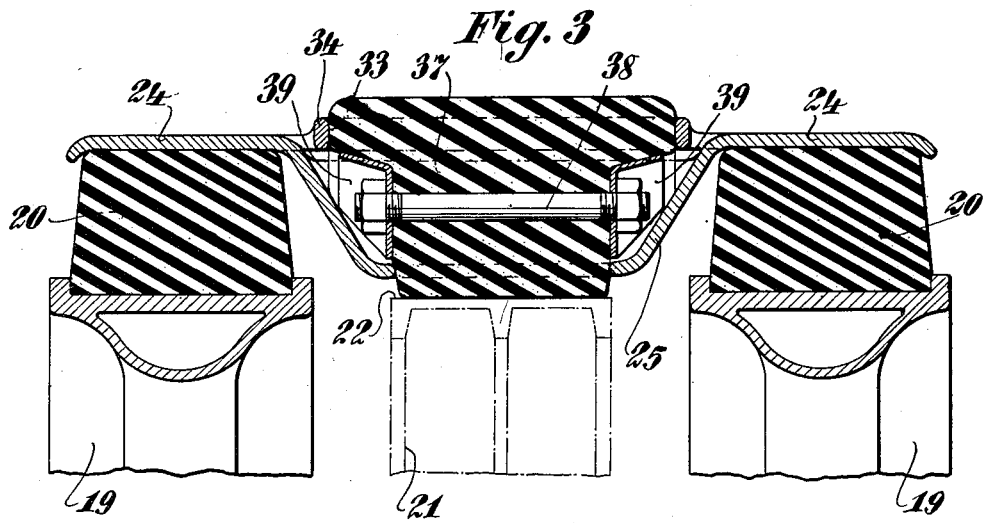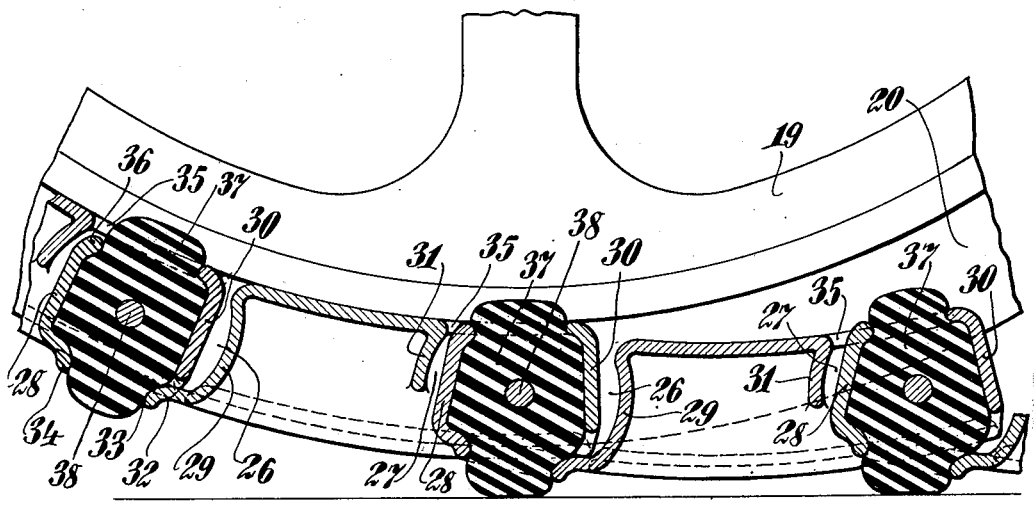

Patented Dec. 11, 1934

1,984,072

UNITED STATES PATENT OFFICE 1,984,072

RUBBER ARTICULATED ENDLESS TRACK

Alfred F. Masury, New York, and Frank J. Kohlberger, Whitestone, N. Y., assignor to International Motor Company, New York, N. Y., a corporation of Delaware Application September 24, 1932, Serial No. 634,716

5 Claims. (Cl. 305—8)

The present invention relates to endless tracks and wheel constructions for motor vehicles and embodies, more specifically, an improved endless track construction and means for mounting the same upon motor vehicles wherein the elements of the track are articulated by means of rubber blocks which are secured in such fashion that relative movement between the elements of the track takes place without substantial contact directly between the elements. In this connection, the rubber blocks yield to adjust themselves to the relative changes in relationship between the adjacent bearing surfaces of the track units, thus maintaining, at all times, an effective connection between such elements without giving rise to substantial noise and wear during service.

The invention further contemplates the provision of improved supporting means for the track whereby the track may be conveniently and effectively mounted upon the vehicle to enable a maximum effective supporting surface to be available at all times, the supporting means and rubber mounting means of the track being of such construction that considerable noise and wear is eliminated during service.

Further objects, not specifically enumerated above, will be apparent as the invention is described in greater detail in connection with the accompanying drawings, wherein:

Figure 3 is a view in section, taken on line 3—3 of Figure 1, and looking in the direction of the arrows.

Figure 4 is a view in section, taken transversely through the track elements and showing connecting means between such elements constructed in accordance with the present invention.

Figure 1:
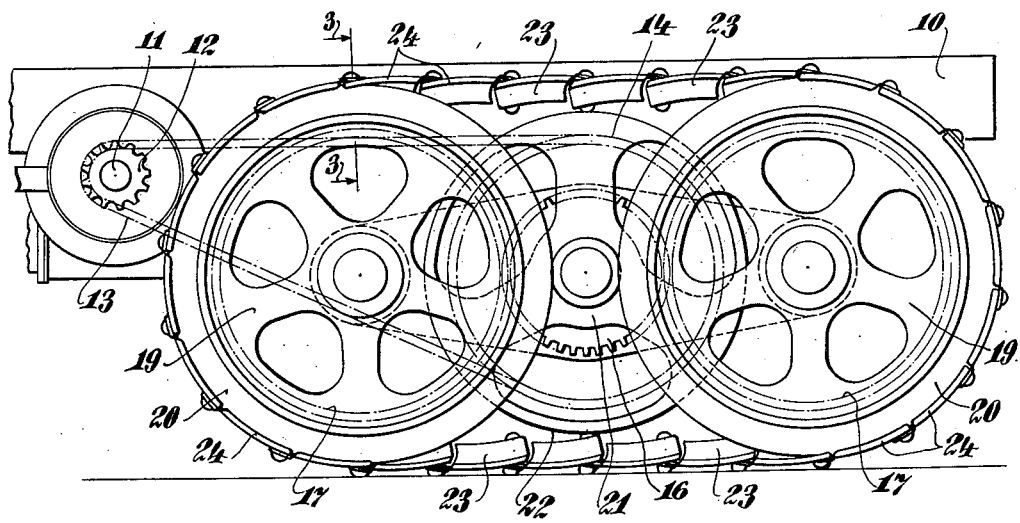
Figure 1 is a view in side elevation, showing a vehicle provided with an endless track and a mounting therefor constructed in accordance with the present invention.
Figure 2:
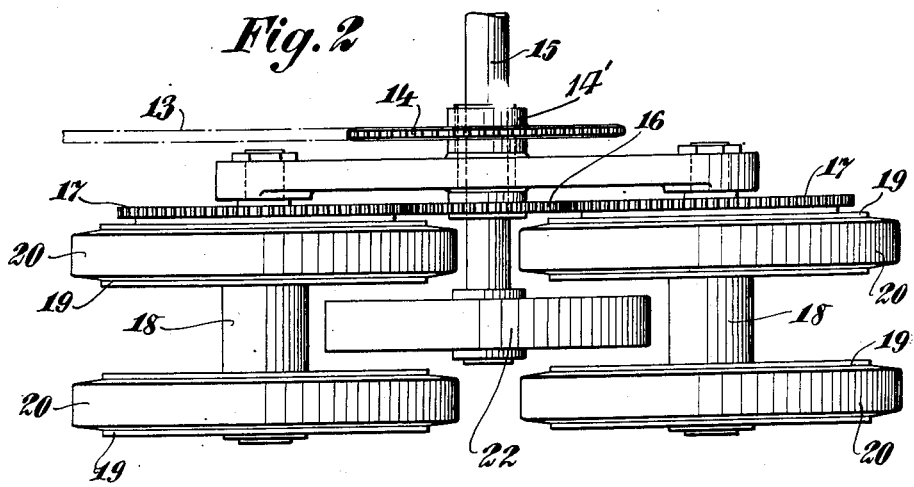
Figure 2 is a plan view of the elements shown in Figure 1, the track being removed from the wheel units.

With reference to the above drawings, a vehicle frame is shown at 10 and is provided with a driving shaft 11 which may be provided with a driving sprocket 12 over which a chain 13 may be mounted. Chain 13 may drive a driven sprocket 14 secured to a sleeve 14' which is mounted upon an anchor tube 15, the sprocket 14 driving a gear 16 also secured to sleeve 14' for engagement with driving gears 17 which are secured to wheel units 18. Anchor tube 15 may be mounted upon a spring carried by the vehicle frame as is common practice. Wheel units 18 may be formed with spaced wheels 19 upon which yielding tires 20 may be mounted and between the spaced wheels 19 an idler wheel 21 is provided, this wheel being journaled upon anchor tube 15 and provided with a cylindrical tire surface 22. Over the above wheel an endless track is mounted, the track being formed of a plurality of elements 23.

In Figures 3 and 4, the track elements will be seen to include tire engaging and tread portions 24 which are adapted to engage the tires 20 of the wheels 19. Between the tread portions 24, the track units or elements are recessed inwardly at 25 and formed with inwardly extending recesses 26 and outwardly extending recesses 27. The inwardly extending recesses are formed by spaced walls 28 and 29, while the outwardly extending recesses are formed by spaced walls 30 and 31. The bottoms 32 of the recesses 26 are formed with apertures 33, the portions of the bottoms adjacent these apertures being curved outwardly at 34 to form a suitable seat for yielding non-metallic material which extends therethrough. Correspondingly, the inner sides of recesses 27 are formed with apertures 35 through which the opposite sides of the yielding non-metallic material extends. The ends of walls 28 are inwardly curved at 36 and, when the elements are assembled, the recesses 26 and 27 are telescoped in order that walls 28 and 30 may be spaced by blocks of yielding non-metallic material 37. These blocks of yielding non-metallic material are adapted to be compressed by bolts 38 which engage seating plates 39 to limit the endwise flow of the material of the blocks. Being compressed between the plates 39 and the walls 30 and 28, the material of the blocks flows through apertures 33 and 35 as illustrated in Figure 4. When the track is mounted over the wheels and tires, as shown in Figure 1, the portions of the blocks of yielding non-metallic material extending through apertures 35 engage the cylindrical bearing surface 22 of the auxiliary supporting wheel 21 intermediate the wheels 19, thus serving as a support for the track span upon the ground surface between the main supporting wheels.

In addition to serving as an effective supporting mechanism for the track, the foregoing structure is of such nature as to eliminate metal to metal contact between the wheels and track elements, as well as between the adjacent track elements themselves.

While the invention has been described with specific reference to the accompanying drawings, it is not to be limited, save as defined in the appended claims.

We claim as our invention:

1. A wheel unit having wheels mounted upon the ends thereof and rotatably connected intermediate its ends to a vehicle frame, an auxiliary bearing wheel on the unit between the first wheels, an endless track mounted over the first wheels and adapted to engage the auxiliary wheel, said track being formed of a plurality of similar units, and yielding non-metallic means on the track projecting from opposite sides thereof to engage yieldingly the auxiliary wheel and the surface over which the vehicle passes.

2. An endless track formed of a plurality of units each having a recessed portion receiving yielding non-metallic material and formed with an aperture in the bottom thereof through which the yielding material may flow, and a recessed portion spaced from the first recessed portion adapted to telescope with the recessed portion of an adjacent element corresponding to the first recessed portion, the top of the second recessed portion being formed with an aperture through which the yielding material may flow, a transverse bolt passing through the yielding material, and seats on the bolt engaging the opposite ends of the material to maintain the material under compression.

3. An endless track formed of a plurality of units each having means to connect the units together comprising a recessed portion receiving yielding non-metallic material and formed with an aperture in the bottom thereof through which the yielding material may flow, each of said units further having a recessed portion spaced from the first recessed portion adapted to telescope with the recessed portion of an adjacent element corresponding to the first recessed portion, the top of the second recessed portion being formed with an aperture through which the yielding material may flow.

4. An endless track formed of a plurality of units each having means to connect the units together comprising a recessed portion receiving yielding non-metallic material and formed with an aperture in the bottom thereof through which the yielding material may flow, each of said units further having a recessed portion spaced from the first recessed portion adapted to telescope with the recessed portion of an adjacent element corresponding to the first recessed portion, the top of the second recessed portion being formed with an aperture through which the yielding material may flow, and means to compress the yielding non-metallic material.

5. An endless track formed of a plurality of units each having means to connect the units together comprising a recessed portion receiving yielding non-metallic material and formed with an aperture in the bottom thereof through which the yielding material may flow, and a recessed portion spaced from the first recessed portion adapted to telescope with the recessed portion of an adjacent element corresponding to the first recessed portion, said portions when telescoped comprising spaced walls, the top of the second recessed portion being formed with an aperture through which the yielding material may flow, the spaced walls of the telescoped recessed portions being formed with curved edges and serving as seats for the yielding non-metallic material.

ALFRED F. MASURY.
FRANK J. KOHLBERGER.